United States Patent
Martin et al.

(10) Patent No.: US 10,675,835 B1
(45) Date of Patent: Jun. 9, 2020

(54) DUAL-LAYERED FLEECE FIRE BARRIER

(71) Applicant: Precision Custom Coatings LLC, Totowa, NJ (US)

(72) Inventors: Christopher Keith Martin, Wayne, NJ (US); Aneta Konior, Oak Ridge, NJ (US); Peter Longo, Saddle River, NJ (US)

(73) Assignee: Precision Textiles LLC, Totowa, NJ (US)

( * ) Notice: Subject to any disclaimer, the term of this patent is extended or adjusted under 35 U.S.C. 154(b) by 0 days.

(21) Appl. No.: 15/452,055

(22) Filed: Mar. 7, 2017

Related U.S. Application Data

(60) Provisional application No. 62/305,167, filed on Mar. 8, 2016.

(51) Int. Cl.
*B32B 5/26* (2006.01)
*B32B 5/02* (2006.01)

(52) U.S. Cl.
CPC ...... *B32B 5/022* (2013.01); *B32B 2262/0276* (2013.01); *B32B 2262/062* (2013.01); *B32B 2307/3065* (2013.01); *B32B 2317/10* (2013.01)

(58) Field of Classification Search
CPC ....... B32B 5/022; B32B 5/26; B32B 2250/00; B32B 2250/20
See application file for complete search history.

(56) References Cited

U.S. PATENT DOCUMENTS

| | | | |
|---|---|---|---|
| 4,067,209 A * | 1/1978 | Kucera | D04B 21/14 66/193 |
| 4,555,811 A | 12/1985 | Shimalla | |
| 5,007,123 A | 4/1991 | Salyards | |
| 5,011,731 A | 4/1991 | Nakamori et al. | |
| 5,496,623 A | 3/1996 | Fox | |
| 7,225,487 B2 | 6/2007 | Small, Jr. et al. | |
| 7,259,117 B2 * | 8/2007 | Mater | A47C 31/001 442/414 |
| 7,365,032 B1 | 4/2008 | Adachi et al. | |
| 7,410,920 B2 | 8/2008 | Davis | |
| 7,473,659 B2 | 1/2009 | Sytz | |
| 7,484,256 B2 | 2/2009 | Murphy et al. | |
| 7,638,192 B2 | 12/2009 | Murphy et al. | |
| 7,851,392 B2 | 12/2010 | Davis | |
| 7,858,542 B2 | 12/2010 | Mio et al. | |

(Continued)

OTHER PUBLICATIONS http://dictionary-reference.com/browse/sew?s=t.

(Continued)

*Primary Examiner* — Andrew T Piziali
(74) *Attorney, Agent, or Firm* — Greenberg Traurig, LLP

(57) ABSTRACT

A fire barrier fabric includes a first layer including a fleece, flame-retardant cellulosic fibers and a binder; and a second layer including flame-retardant cellulosic fibers and a binder. The fleece may include natural crimped wool. The fleece may include one or more of sheep wool fleece, alpaca wool fleece, cashmere wool fleece, and silk fleece. The flame-retardant cellulosic fibers may be inherently flame-retardant cellulosic fibers. The flame-retardant cellulosic fibers may include one or more of treated flame-retardant cotton fibers, flame-retardant bamboo fibers, flame-retardant viscose fibers, flame-retardant rayon fibers, and flame-retardant silica-filled viscose fibers.

20 Claims, 2 Drawing Sheets

(56) References Cited

U.S. PATENT DOCUMENTS

| | | |
|---|---|---|
| 8,236,712 B2 | 8/2012 | Jones et al. |
| 8,703,631 B2 | 4/2014 | Sytz |
| 2002/0002938 A1 | 1/2002 | Alberts et al. |
| 2004/0097156 A1 | 5/2004 | McGuire et al. |
| 2004/0102112 A1 | 5/2004 | McGuire et al. |
| 2004/0106347 A1 | 6/2004 | McGuire et al. |
| 2004/0185731 A1 | 9/2004 | McGuire |
| 2005/0164582 A1 | 7/2005 | McGuire et al. |
| 2006/0000024 A1 | 1/2006 | McGuire et al. |
| 2006/0162088 A1 | 7/2006 | Daly |
| 2007/0298668 A1 | 12/2007 | DeFranks |
| 2008/0057807 A1 | 3/2008 | Tutterow et al. |
| 2009/0311933 A1 | 12/2009 | Mihoichi et al. |
| 2010/0035054 A1 | 2/2010 | White |

OTHER PUBLICATIONS

"Inherently Flame Retardant and Resistant Fibres," CIRFS, European Man-made Fibres Association, http://www.cirfs.org, Date Retrieved: Dec. 21, 2016.

"Stitchbonding" Tietex International Ltd. website, Viewed: May 26, 2016, URL: http://tietex.com/stitchbonding/.

* cited by examiner

DUAL-LAYERED FLEECE FIRE BARRIER

CROSS-REFERENCE TO RELATED APPLICATION

The present application claims the benefit of U.S. Provisional Patent Application No. 62/305,167, filed on Mar. 8, 2016, which is incorporated by reference herein.

FIELD OF THE INVENTION

The present invention relates to textiles, and particularly to fleece fabrics, dual layer fabrics, and fabrics that are useful as fire barriers for mattresses.

BACKGROUND OF THE INVENTION

Each year, thousands of residential fires are caused in the United States by the ignition of mattresses and bedding, resulting in hundreds of deaths and hundreds of millions of dollars in property losses. Heightened awareness of fire prevention has led to the development of standards and regulations directed to the reducing the likelihood that such fires will occur. One approach to reducing the likelihood of residential fires is to use flame-resistant fabrics as flame barriers in mattresses and bedding.

SUMMARY OF THE INVENTION

A fire barrier fabric, according to an embodiment of the present invention, includes a first layer including a fleece, flame-retardant cellulosic fibers and a binder; and a second layer including flame-retardant cellulosic fibers and a binder. In an embodiment, the fleece includes natural crimped wool. In an embodiment, the fleece includes one or more of sheep wool fleece, alpaca wool fleece, cashmere wool fleece, silk fleece, cotton fleece, fleece comprising natural cellulosic fibers, and fleece comprising synthetic fibers. In an embodiment, the flame-retardant cellulosic fibers of the first layer and/or the second layer are inherently flame-retardant cellulosic fibers. In an embodiment, the flame-retardant cellulosic fibers of the first layer and/or the second layer include one or more of treated flame-retardant cotton fibers, flame-retardant bamboo fibers, flame-retardant viscose fibers, flame-retardant rayon fibers, and flame-retardant silica-filled viscose fibers.

BRIEF DESCRIPTION OF THE FIGURES

For a more complete understanding of the present invention, reference is made to the following detailed description of exemplary embodiments considered in conjunction with the accompanying drawing, in which.

DETAILED DESCRIPTION OF THE INVENTION

Figure 1:
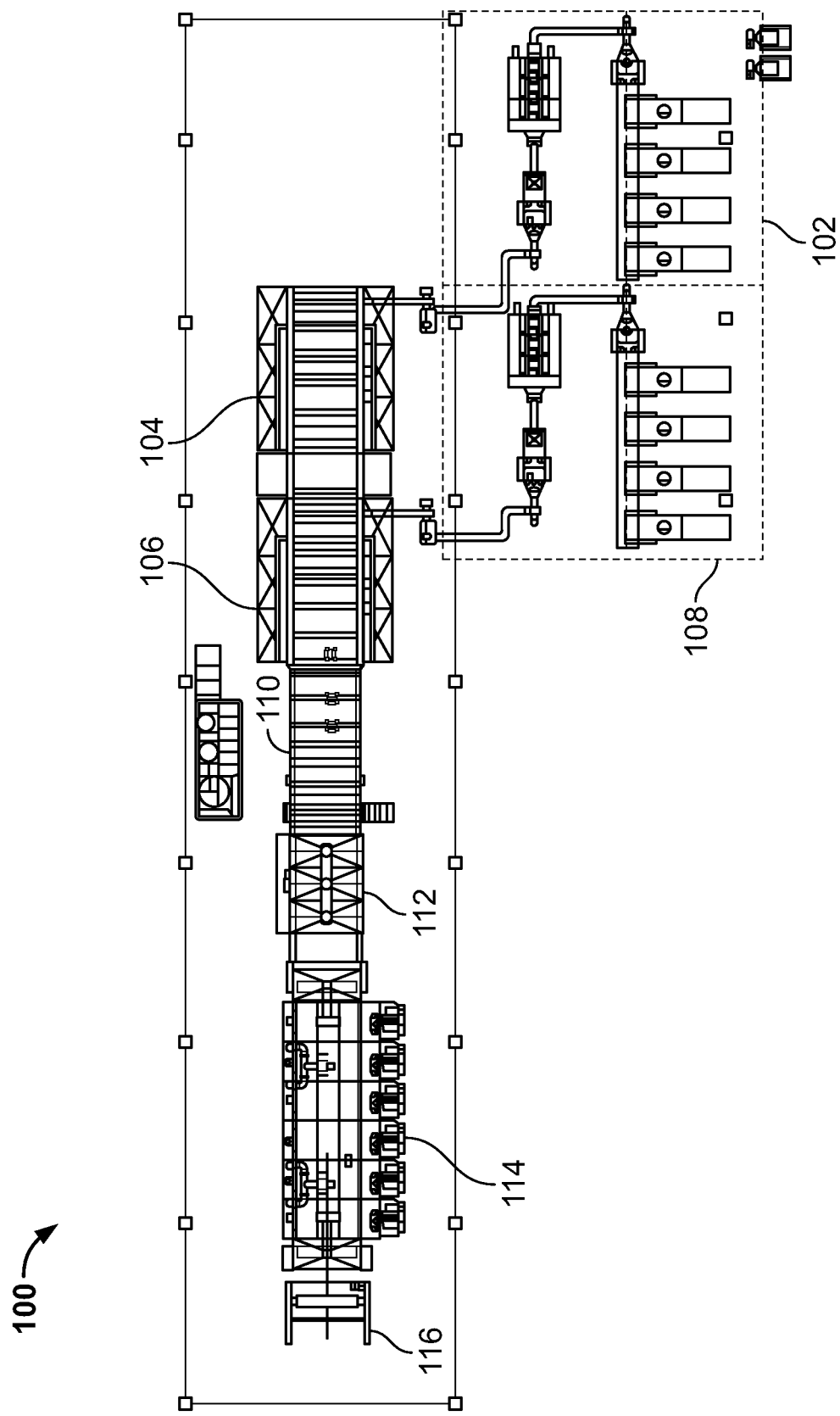
FIG. 1 is a schematic plan view of an exemplary arrangement of equipment that may be used to manufacture a dual-layered fabric according to an embodiment of the present invention.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", and "the" include the plural referents unless otherwise stated. Additionally, the terms "comprises" and "comprising" when used herein specify that certain features are present in that embodiment, however, this phrase should not be interpreted to preclude the presence or additional of additional steps, operations, features, components, and/or groups thereof.

In an embodiment, the present invention includes a fire barrier having a first layer and a second layer, wherein the first and second layers are joined together. In an embodiment, the first and second layers are non-woven fabrics.

In an embodiment, the first layer includes a fleece. In an embodiment, the fleece includes natural crimped wool. In an embodiment, the fleece is selected from the group consisting of sheep wool fleece, alpaca wool fleece, cashmere wool fleece, silk fleece, cotton fleece, fleece comprising natural cellulosic fibers, and fleece comprising synthetic fibers. In an embodiment, the first layer further includes flame-retardant cellulosic fibers. In an embodiment, the flame-retardant cellulosic fibers are flame-retardant viscose fibers. In an embodiment, the flame-retardant viscose fibers are inherently flame-retardant viscose fibers having silica nanoparticles within the fibers, which are sometimes referred to as silica-filled viscose fibers. In an embodiment, the first layer further includes a binder. In an embodiment, the binder includes low-melt polyester fibers. In an embodiment, the binder includes low-melt biphasic polyester fibers.

In an embodiment, the second layer includes flame-retardant cellulosic fibers. In an embodiment, the flame-retardant cellulosic fibers are flame-retardant viscose fibers. In an embodiment, the flame-retardant viscose fibers are inherently flame-retardant viscose fibers having silica nanoparticles within the fibers, which are sometimes referred to as silica-filled viscose fibers. In an embodiment, the second layer further includes a binder. In an embodiment, the binder includes low-melt polyester fibers. In an embodiment, the binder includes low-melt biphasic polyester fibers. In an embodiment, the second layer further includes bulking fibers. In an embodiment, the bulking fibers include conjugated polyester fibers.

In an embodiment, the total weight of the dual-layer fire barrier is in the range of 2 ounce/square yard (osy) to 20 osy. In an embodiment, the total weight of the first layer is in the range of 1 osy to 10 osy. In an embodiment, the total weight of the second layer is in the range of 1 osy to 15 osy.

In an embodiment, fleece constitutes from 10% to 80% of the first layer, by weight; in another embodiment, the fleece constitutes from 30% to 80% of the first layer, by weight. In an embodiment, the binder constitutes from 10% to 50% of the first layer, by weight; in another embodiment, the binder constitutes from 10% to 20% of the first layer, by weight. In an embodiment, the flame-retardant cellulosic fibers constitute the balance of the weight of the first layer. In an exemplary embodiment, the first layer includes 50% fleece, by weight, 30% flame-retardant cellulosic fibers, by weight, and 20% binder, by weight. In the aforesaid exemplary embodiment, the first layer has a weight of 3.7 osy.

In an embodiment, the flame-retardant cellulosic fibers constitute from 20% to 80% of the second layer, by weight; in another embodiment, the flame-retardant cellulosic fibers constitute from 50% to 80% of the second layer, by weight. In an embodiment, the binder constitutes from 10% to 50% of the second layer, by weight; in another embodiment, the binder constitutes from 10% to 20% of the second layer, by weight. In an embodiment, bulking fibers constitute the balance of the weight of the second layer. In an exemplary embodiment, the second layer includes 80% flame-retardant cellulosic fibers, by weight, and 20% binder, by weight. In an embodiment, a dual-layer fabric consisting of the exemplary first layer and the exemplary second layer has a total weight of 5.4 osy.

In an embodiment, the densities of the flame-retardant cellulosic fibers are in the range of 1.5 denier to 20 denier; in another embodiment, the densities of the flame-retardant cellulosic fibers are in the range of 1.5 denier to 5 denier. In an embodiment, the binder includes fibers having densities in the range of 2 denier to 15 denier; in another embodiment, the binder includes fibers having densities in the range of 2 denier to 4 denier.

In an embodiment, the dual-layer fire barrier is arranged such that the first layer is an upper or outer layer of an article of manufacture. In an embodiment, the dual-layer fire barrier is arranged for use as part of a bed or bedding, such that the first layer is a sleep surface. In an embodiment, the dual-layer fire barrier is the uppermost fabric in in a quilted mattress top panel, and is located immediately under the ticking or sleep surface, with the first layer (i.e., the fleece layer) being the upper surface of the dual-layer fire barrier. The dual-layer fire barrier fabric may also readily be adapted for other uses in typical household items and clothing by the selection of materials, fiber blends, and fabric weights from those identified herein by persons having ordinary skill in the art. Persons having ordinary skill in the art will also recognize materials that may be added to, or substituted for, those identified herein to produce useful and aesthetically pleasing fleece fabrics.

In an embodiment, the fire barrier fabric is provided with an intermediate layer between the first and second layers. In an embodiment, the intermediate layer is non-fire-retardant filler layer. In an embodiment, the intermediate layer includes fire-retardant material. In an embodiment, the intermediate layer is a filler layer. In an embodiment, the filler material in the filler layer includes yarn. In an embodiment, the yarn is a textured yarn. In an embodiment, the yarn is a polyester yarn, a nylon yarn, or a yarn of similar synthetic materials. In an embodiment, the yarn comprises natural fibers. In an embodiment, the yarn comprises cellulosic fibers, such as, cotton, bamboo, jute, rayon, or viscose. In an embodiment, the yarn is a fire-resistant yarn. In an embodiment, the yarn is a fire-resistant yarn. In an embodiment, the fire-resistant yarn is a yarn that has been provided with flame-retardant additives. An exemplary fire-resistant yarn is a fire-resistant draw textured yarn, such as a fully-drawn, fully-oriented polyester multifilament yarn with a phosphate-based fire-retardant additive.

In an embodiment, the layers of the fire barrier fabric are joined to each other. Methods of joining textile layers that are known in the art may be used, including stitch-bonding, needle-punching, sewing, thermal bonding, ultrasonic bonding, and lamination. In an embodiment, the first and second layers of the fire barrier fabric are joined to each other.

Figure 2:
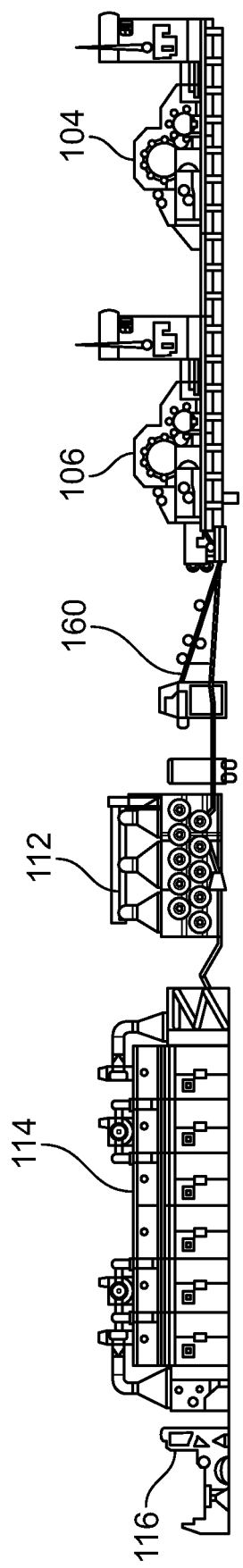
FIG. 2 is a schematic elevation view of a portion of the arrangement of equipment presented schematically in FIG. 1.

FIGS. 1 and 2 are schematic illustrations of an arrangement 100 of equipment which may be used in an exemplary method of making a dual-layer fleece fire barrier according to embodiments of the present invention. The arrangement 100 may consist of textile manufacturing equipment known in the textile industry or of textile manufacturing equipment developed at some future time that provide the same functions described herein.

Referring to FIGS. 1 and 2, in a method according to an embodiment of the present invention, the fibers of the second layer of the dual-layer fleece fire barrier are collected from a first series of bins using an arrangement 102 of textile manufacturing equipment that is suitable for this purpose. The fibers are fed into a first carding machine 104, which cards the fibers into a first non-woven arrangement. The first non-woven arrangement of fibers are transferred to a second carding machine 106. The fibers of the first layer of the dual-layer fleece fire barrier are collected from a second arrangement 108 of textile manufacturing equipment that is suitable for this purpose, and are fed into the second carding machine 106 such that they form a second non-woven arrangement of fibers that overlaps the first non-woven arrangement of fibers. In another embodiment, the fibers of the first layer of the fire barrier are carded in the first carding machine 104, and the fibers of the second layer of the fire barrier are carded in the second carding machine 106, and overlap the fibers of the first layer of the fiber barrier. In an embodiment, some of the fibers of the first and/or second layer are rearranged in a random fashion by a randomizer roll (not shown). After the fibers of the first and second layers have been carded, the resulting double-layer nonwoven fabric is dried in a pre-dryer 110, then conveyed to an oven 112, where it is heated to a temperature that at least partially melts the binder, thereby bonding the first layer to the second layer. The bonded fabric is then wound, cut, and/or slit using equipment 116 suitable for that purpose.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention as described herein, and in the appended claims.

We claim:

1. A fire barrier fabric, consisting of:
    a first non-woven layer consisting of fleece fibers, flame-retardant cellulosic fibers and a binder; and
    a second non-woven layer consisting of flame-retardant cellulosic fibers and a binder;
    wherein said fleece fibers are selected from the group consisting of wool fibers, silk fibers, and combinations thereof;
    wherein said fleece fibers constitute 50% of said first non-woven layer by weight, said binder of said first layer constitutes from 10% to 50% of said first non-woven layer by weight, and said flame-retardant cellulosic fibers of said first non-woven layer constitute the balance of said first non-woven layer by weight.

2. The fire barrier fabric of claim 1, wherein said first non-woven layer is joined to said second non-woven layer.

3. The fire barrier fabric of claim 1, wherein said wool fibers include natural crimped wool fibers.

4. The fire barrier fabric of claim 1, wherein said flame-retardant cellulosic fibers of said first non-woven layer are inherently flame-retardant cellulosic fibers.

5. The fire barrier fabric of claim 1, wherein said flame-retardant cellulosic fibers of said first non-woven layer are selected from the group consisting of treated flame-retardant cotton fibers, flame-retardant bamboo fibers, flame-retardant viscose fibers, flame-retardant rayon fibers, and flame-retardant silica-filled viscose fibers.

6. The fire barrier fabric of claim 1, wherein said binder of said first non-woven layer includes low-melt polyester fibers.

7. The fire barrier fabric of claim 1, wherein said binder of said first non-woven layer includes low-melt biphasic polyester fibers.

8. The fire barrier fabric of claim 1, wherein said flame-retardant cellulosic fibers of said second non-woven layer are inherently flame-retardant cellulosic fibers.

9. The fire barrier fabric of claim 1, wherein said flame-retardant cellulosic fibers of said second non-woven layer are selected from the group consisting of treated flame-retardant cotton fibers, flame-retardant bamboo fibers, flame-retardant viscose fibers, flame-retardant rayon fibers, and flame-retardant silica-filled viscose fibers.

10. The fire barrier fabric of claim 1, wherein said binder of said second non-woven layer includes low-melt polyester fibers.

11. The fire barrier fabric of claim 1, wherein said binder of said second non-woven layer includes low-melt biphasic polyester fibers.

12. The fire barrier fabric of claim 1, wherein said second non-woven layer includes bulking fibers.

13. The fire barrier fabric of claim 12, wherein said bulking fibers include conjugated polyester fibers.

14. The fire barrier fabric of claim 1, wherein said binder of said second non-woven layer constitutes from 10% to 50% of said second non-woven layer by weight, and said flame-retardant cellulosic fibers of said second non-woven layer constitute the balance of said second non-woven layer by weight.

15. The fire barrier fabric of claim 12, wherein said binder of said second non-woven layer constitutes from 10% to 50% of said second non-woven layer by weight, and said flame-retardant cellulosic fibers of said second non-woven layer and said bulking fibers of said second layer constitute the balance of said second layer by weight.

16. The fire barrier fabric of claim 1, wherein said first non-woven layer and said second non-woven layer together have a weight in the range of 2 osy to 20 osy.

17. The fire barrier fabric of claim 1, wherein said flame-retardant cellulosic fibers have densities in the range of 1.5 denier to 20 denier.

18. The fire barrier fabric of claim 1, wherein said binder includes fibers having densities in the range of 2 denier to 15 denier.

19. A fire barrier fabric, consisting of:
   a first non-woven layer consisting of fleece fibers, flame-retardant cellulosic fibers and a binder; and
   a second non-woven layer consisting of flame-retardant cellulosic fibers, bulking fibers, and a binder;
   wherein said fleece fibers are selected from the group consisting of wool fibers, silk fibers, and combinations thereof; and
   wherein said fleece fibers constitute 50% of said first non-woven layer by weight, said binder of said first layer constitutes from 10% to 50% of said first non-woven layer by weight, and said flame-retardant cellulosic fibers of said first non-woven layer constitute the balance of said first non-woven layer by weight.

20. A fire barrier fabric, comprising:
   a first non-woven layer consisting of fleece fibers, flame-retardant cellulosic fibers and a binder; and
   a second non-woven layer consisting of flame-retardant cellulosic fibers and a binder, wherein said fleece fibers are selected from the group consisting of wool fibers, silk fibers, and combinations thereof; and
   wherein said fleece fibers constitute 50% of said first non-woven layer by weight, said binder of said first layer constitutes from 10% to 50% of said first non-woven layer by weight, and said flame-retardant cellulosic fibers of said first non-woven layer constitute the balance of said first non-woven layer by weight.

\* \* \* \* \*